United States Patent
Lee

(12) 
(10) Patent No.: US 6,169,645 B1
(45) Date of Patent: Jan. 2, 2001

(54) MAGNETO-RESISTIVE HEAD HAVING THE SENSOR ORTHOGONALLY POSITIONED RELATIVE TO THE WRITE GAP

(75) Inventor: Hae-Jung Lee, Kumi (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/232,139

(22) Filed: Jan. 15, 1999

(30) Foreign Application Priority Data

Jan. 16, 1998 (KR) .................................................. 98/1116

(51) Int. Cl.$^7$ ............................................................ G11B 5/39
(52) U.S. Cl. ................................................................. 360/313
(58) Field of Search ........................... 360/113, 313–316

(56) References Cited

U.S. PATENT DOCUMENTS

| | | |
|---|---|---|
| 4,654,739 | 3/1987 | Takahashi et al. . |
| 4,967,298 | 10/1990 | Mowry . |
| 5,027,243 | 6/1991 | Gill et al. . |
| 5,406,433 | 4/1995 | Smith . |
| 5,434,733 | 7/1995 | Hesterman et al. . |
| 5,653,013 | * 8/1997 | Gill ....................................... 360/113 |
| 5,654,854 | 8/1997 | Mallary . |
| 5,703,738 | 12/1997 | Kim et al. . |

* cited by examiner

*Primary Examiner*—A. J. Heinz
(74) *Attorney, Agent, or Firm*—Robert E. Bushnell, Esq.

(57) ABSTRACT

There is provided a magneto-resistive head in a hard disk drive. In the magneto-resistive head, an upper write pole has a write track width, and a lower write pole is positioned under the upper write pole, separated by a predetermined write gap. A magneto-resistive sensor is positioned under the lower write pole, apart by a predetermined gap and orthogonally to the length of the write gap, and has a predetermined read track width, for efficiently reading data from a disk. A shield is positioned under the magneto-resistive sensor, separated by a predetermined gap.

19 Claims, 4 Drawing Sheets

MAGNETO-RESISTIVE HEAD HAVING THE SENSOR ORTHOGONALLY POSITIONED RELATIVE TO THE WRITE GAP

CLAIM OF PRIORITY

This application makes reference to, incorporates the same herein, and claims all benefits accruing under 35 U.S.C. §119 from my application entitled MAGNETO-RESISTIVE HEAD IN HARD DISK DRIVE filed with the Korean Industrial Property Office on Jan. 16, 1998 and there duly assigned Ser. No. 98-1116 by that Office.

BACKGROUND OF THE INVENTION

1. Field of the Invention

The present invention relates to the class of dynamic magnetic information storage devices, and in particular, to a magneto-resistive head of a hard disk drive.

2. Description of the Related Art

A hard disk drive (HDD) magnetically writes and reads data on and from a rotating disk and is widely used as an auxiliary memory device for computer systems due to the ability of the drive to access a large amount of data at high speed. A magnetic head is generally used to write and read data on and from the disk. The magnetic head has evolved from magnetic inductive heads such as an MIG (Metal In Gap) head of conventional ring type and from thin-film heads to magneto-resistive heads. This development has occurred because the inductive head simultaneously reads and writes with a single gap between two poles and thus has limitations in inductance.

The magneto-resistive head performs write and read operations reliably because it writes data with a conventional inductive head and reads data with a magneto-resistive sensor, independently. The magneto-resistive sensor reads data from a disk using the principle that an electrical characteristic, that is, electrical resistance, varies with changing magnetic properties on the track of the disk.

A conventional magneto-resistive bead has a write pole which includes an upper write pole and a lower write pole, for writing data on a disk. The two write poles are spaced from each other by a predetermined gap. A shield protects a magneto-resistive sensor together with the lower write pole. The magneto-resistive sensor has a magneto-resistive element (MRE) and a soft adjacent layer (SAL), for reading data written on the disk.

The magneto-resistive sensor is disposed along the length of the write gap. The conventional magneto-resistive sensor is positioned with its longer edge orthogonal to the track which is in the direction of movement the magnetic medium, so that the direction of a magnetic flux in the MRE of the magneto-resistive sensor is changed according to variations of a magnetic field vertically generated over a disk and a resistance variation value is read.

However, the conventional magneto-resistive sensor should be made thin enough to render its whole area as a single domain. As a result of this thinness, however, the sensor can fail due to slight external shock such as static discharge, leading to a decrease in product reliability and difficulty in fabrication.

In addition, since the magneto-resistive sensor is oriented orthogonal to the track, it is asymmetrical to the tracks due to variation of resistance in the MRE of the magneto-resistive sensor with the direction of a magnetic flux. The asymmetry to the tracks is due to the distance difference between the write gap and the magneto-resistive sensor, and a skew angle owing to the radial movement of the head. The more distant the head is from a center track, the larger the skew angle becomes. An off-track is generated due to the above skew-angle. Because of the above distance difference and the skew angle, there is a possibility that the magneto-resistive sensor cannot read the signal of the track written by the write gap.

Additional examples of magnetic heads of the conventional art are seen, for example, in the following U.S. Patents. U.S. Pat. No. 4,654,739, to Takahashi et al, entitled *Thin Film Magnetic Head for Reproducing Perpendicular Magnetization*, discloses a thin film magnetic head for reproducing magnetization in which the magnetoresistive element is arranged orthogonally to the travelling direction of the recording medium.

U.S. Pat. No. 4,967,298, to Mowry, entitled *Magnetic Head with Magnetoresistive Sensor, Inductive Write Head, and Shield*, describes an elongated magnetoresistive sensor strip which is longitudinally biased to maintain a single domain sense region. The magnetoresistive strip is oriented perpendicular, that is, orthogonal, to the direction of rotation of the magnetic disk.

U.S. Pat. No. 5,027,243, to Gill et al., entitled *Self-Initialization of Short Magnetosresistive Sensors into a Single Domain State*, describes a dual-element magnetoresistive sensor that uses the longitudinal field produced by the sense-bias currents to initialize the elements into a stable antiparallel state. The device allows a symmetric across-the-track response. This dual-element sensor is apparently designed to be oriented perpendicularly to the track, as col. 3, lines 23–27 of the patent note that the design allows shorter elements which provide the ability to control track width definition and across-the-track pickup. The dual-element design apparently does not serve to provide redundancy in the event of failure of one of the elements.

U.S. Pat. No. 5,406,433, to Smith, entitled *Dual Magnetoresistive Head for Reproducing Very Narrow Track Width Short Wavelength Data*, describes a head with two magnetoresistive elements which are parallel to each other, with the purpose of giving the head "three dimensional" characteristics. The overall orientation of the magnetoresistive elements is perpendicular to the track and the dual-element design apparently does not serve to provide redundancy in the event of failure of one of the elements.

U.S. Pat. No. 5,434,733, to Hesterman et al., entitled *Planar Head Having Separate Read and Write Gaps*, describes a planar silicon magnetoresistive read/write head which is narrower to avoid the recording medium noise at the edges of the track. The planar head oriented parallel to the recording medium is quite different in design from the conventional art discussed earlier.

U.S. Pat. No. 5,654,854, to Mallary, entitled *Longitudinally Biased Magnetoresistive Sensor Having a Concave Shaped Active Region to Reduce Barkhausen Noise By Achieving a Substantially Single Magnetic Domain State*, describes a magnetoresistive sensor constructed with a concave shaped edge in the plane of the element, such that the "stripe height" of the element is at a minimum in the center of the active region and increases toward the off-track boundary. This magnetoresistive sensor is oriented as in the conventional art with its long edge perpendicular to the track.

U.S. Pat. No. 5,703,738, to Kim et al., entitled *Magnetic Head Magneto-Resistive Element with C-shaped Multi-Layered Structure*, describes a thin-film magnetic head with a three-layer structure and an ellipse-like C-shape.

Based on my observation of the art, then, I have found that what is needed is a magnetic head with a magneto-resistive sensor which can be made thin to render its whole area as a single domain but which is robust to static electricity, and which does not suffer from an asymmetric across-the-track response.

SUMMARY OF THE INVENTION

It is therefore an object of the present invention to provide an improved magneto-resistive head for a hard disk drive.

It is a further object of the invention to provide a head in which the magnetoresistive element has a single domain.

It is a yet further object of the invention to provide a head in which the magnetoresistive sensor has a symmetric across-the-track response.

It is a still further object of the invention to provide a head in which the magnetoresistive head is robust to damage caused by static discharge.

It is a yet still further object of the invention to provide a head which has a low failure rate in fabrication.

To achieve the above objects, the present invention provides a magneto-resistive head having a magneto-resistive sensor modified to remove asymmetry to tracks, in a hard disk drive. In the magneto-resistive head, an upper write pole has a write track width, and a lower write pole is positioned under the upper write pole, apart by a predetermined write gap. A magneto-resistive sensor is positioned under the lower write pole, separated by a predetermined gap and orthogonally to the length of the write gap, and has a predetermined read track width, for efficiently reading data from a disk. A shield is positioned under the magneto-resistive sensor, separated by a predetermined gap.

BRIEF DESCRIPTION OF THE DRAWINGS

The above objects and advantages of the present invention will become more apparent by describing in detail preferred embodiments there of with reference to the attached drawings in which.

DETAILED DESCRIPTION OF THE DRAWINGS

Figure 1:
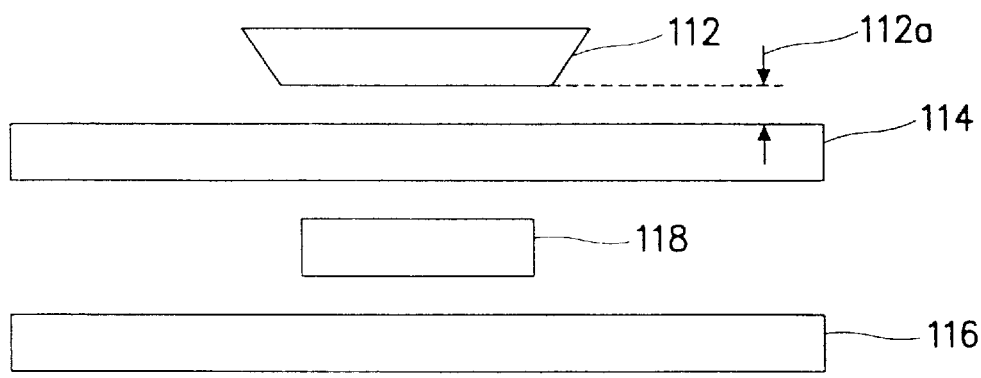
FIG. 1 schematically illustrates a conventional magneto-resistive head.

Turning now to the drawings, the conventional magneto-resistive head described earlier will be described referring to FIGS. 1 and 2. FIG. 1 schematically illustrates the magneto-resistive head. A write pole includes upper write pole 112 and lower write pole 114, for writing data on a disk. The two write poles 112 and 114 are spaced from each other by predetermined gap indicated by arrows 112a. Shield 116 protects magneto-resistive sensor 118 together with lower write pole 114. Magneto-resistive sensor 118 has a magneto-resistive element (MRE) and a soft adjacent layer (SAL), for reading data written on the disk.

Figure 2:
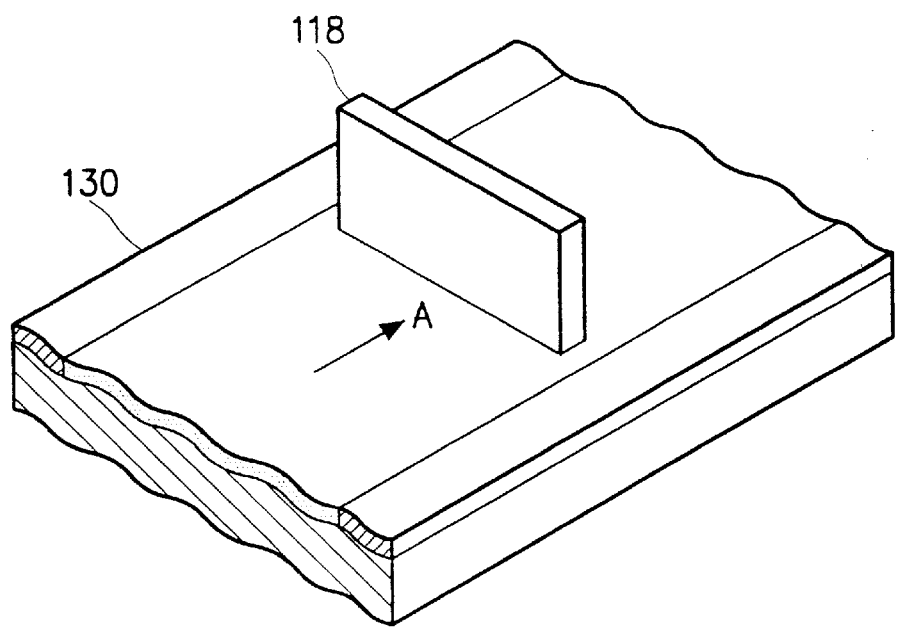
FIG. 2 illustrates a magneto-resistive sensor of the conventional magneto-resistive head, disposed orthogonally to tracks.

Magneto-resistive sensor 118 is disposed along the length of write gap 112a. As shown in FIG. 2, magneto-resistive sensor 118 is positioned orthogonally to tracks, that is, in a direction indicated by A, so that the direction of a magnetic flux in the MRE of magneto-resistive sensor 118 is changed according to variations of a magnetic field vertically generated over disk 130 and a resistance variation value is read.

Preferred embodiments of the present invention will now be described in detail with reference to the attached drawings. Like reference numerals denote the same components in the drawings, and a detailed description of related known structure and function of the present invention will be avoided if it is deemed to obscure the subject matter of the present invention.

Figure 3:
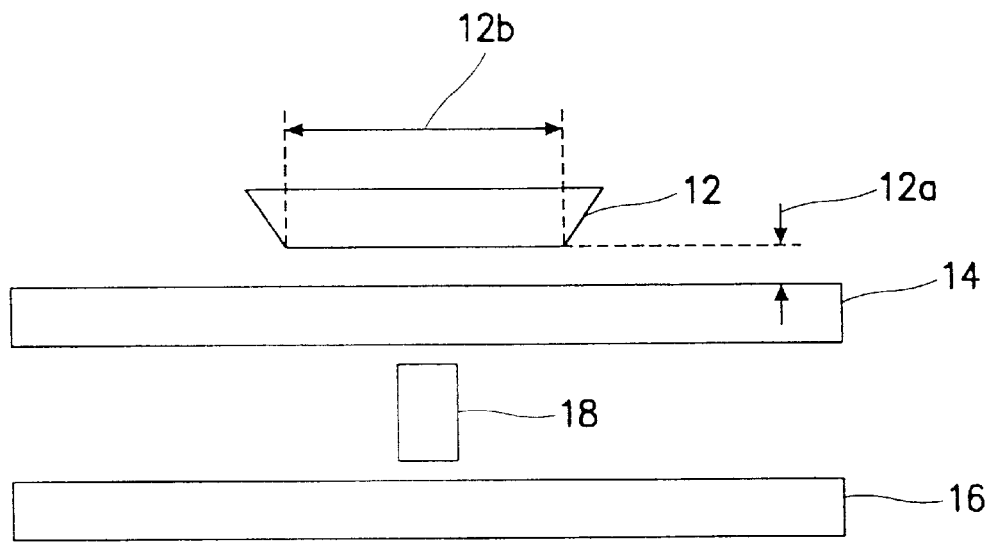
FIG. 3 schematically illustrates a magneto-resistive head according to a first preferred embodiment of the present invention.
Figure 4:
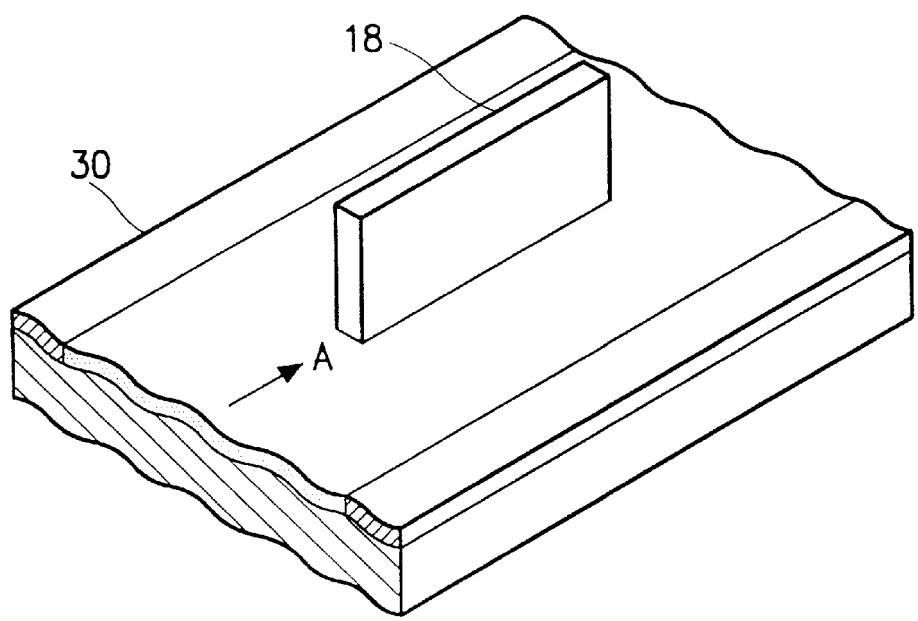
FIG. 4 illustrates a magneto-resistive sensor of the magneto-resistive head according to the first preferred embodiment of the present invention, disposed in parallel with tracks.

Referring to FIG. 3, a magneto-resistive head according to a first preferred embodiment of the present invention has two write poles 12 and 14 spaced from each other by a predetermined gap indicated by arrows 12a. Width 12b of upper write pole 12 is a write width, and gap 12a is a write gap. Magneto-resistive sensor 18 is disposed under lower write pole 14, separated from lower write pole 14 by a predetermined distance. Magneto-resistive sensor 18 is oriented with its longer edge orthogonal to the length of write gap 12a, and parallel to the track of the magnetic medium which is in the direction indicated by A on disk 30, as shown in FIG. 4.

Figure 5:
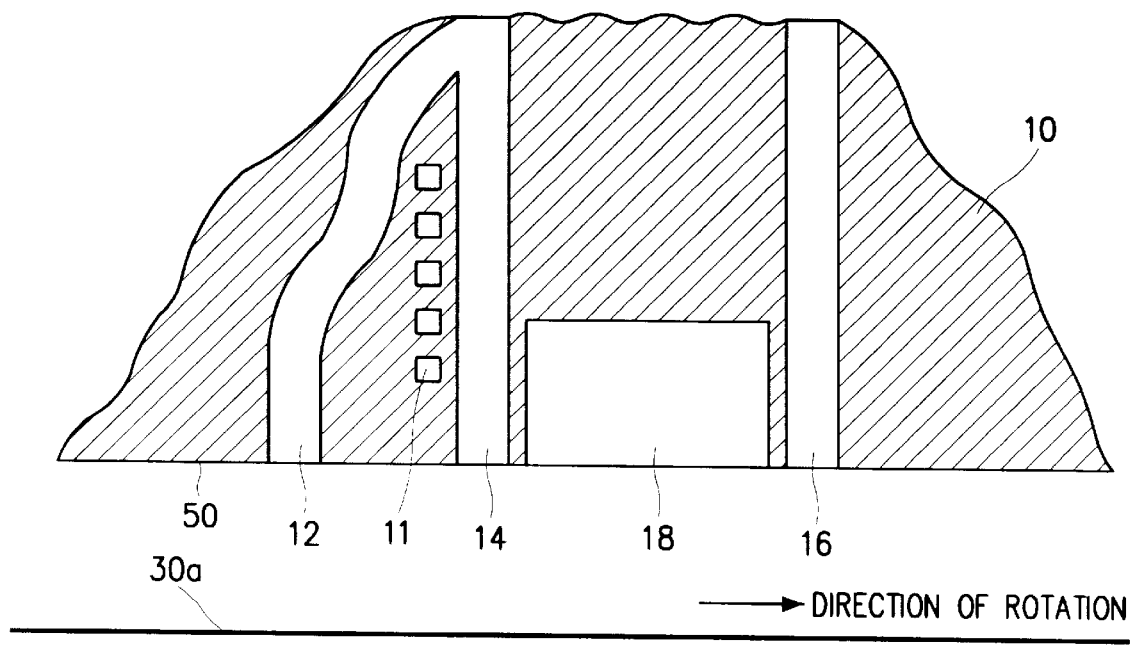
FIG. 5 is a partial sectional view of the magneto-resistive head according to the first preferred embodiment of the present invention.

In the magneto-resistive head as constituted above, the pair of write poles 12 and 14, magneto-resistive sensor 18, and shield 16 are appropriately positioned in grooves of an air bearing surface 50 (ABS) in slider 10, and the grooves are leveled with the ABS by sputtering (See FIG. 5). Thus, when slider 10 is disposed over disk surface 30a, the gap having coils 11 between write poles 12 and 14 performs a write operation, and magneto-resistive sensor 18 positioned in the rotation direction of a disk performs a read operation. That is, magnetic flux of disk surface 30a which is vertically directed from disk 30, changes the resistance of magneto-resistive sensor 18. Thus, magnetoresistive sensor 18 performs the same reading operation as that of the conventional magneto-resistive sensor which is oriented orthogonal to the track.

Figure 6:
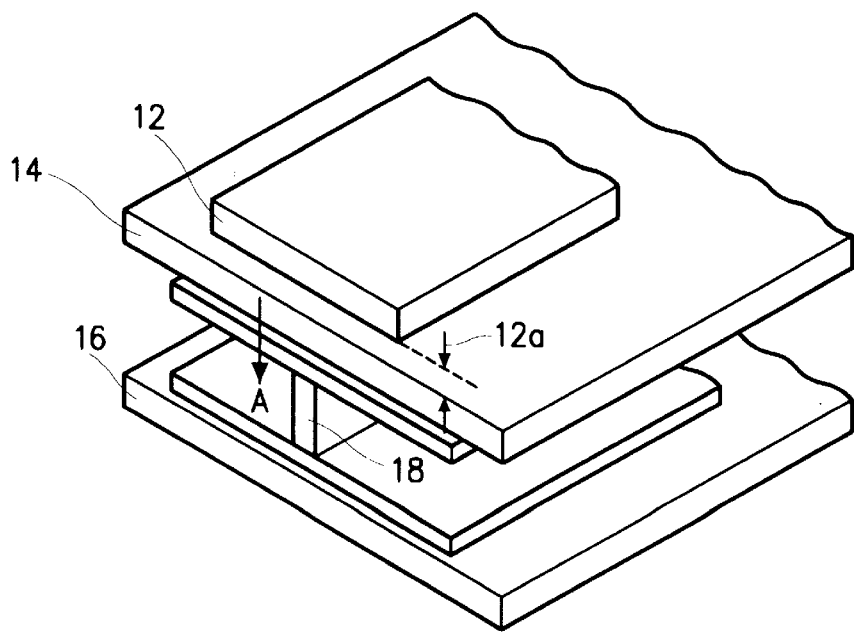
FIG. 6 is a perspective view of the magneto-resistive head according to the first preferred embodiment of the present invention.

A magneto-resistive sensor having an SAL and a dual magneto-resistive sensor having two MREs without an SAL are applied to the magneto-resistive head of the present invention. When the single magneto-resistive sensor 18 is provided as shown in FIG. 6, it is positioned under the center of the write width of upper write pole 12.

Figure 7:
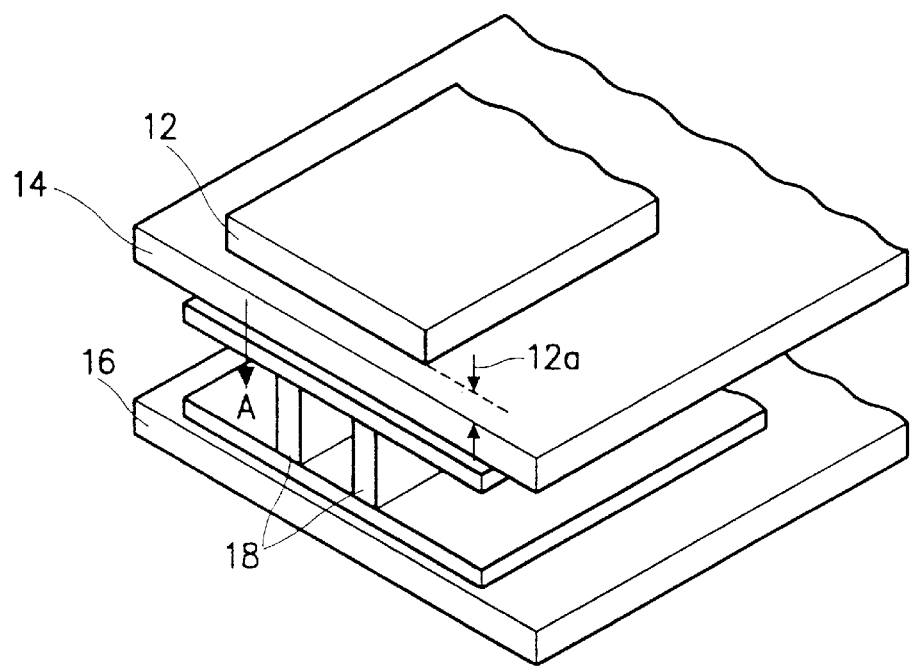
FIG. 7 is a perspective view of a magneto-resistive head according to a second preferred embodiment of the present invention.
Figure 8:
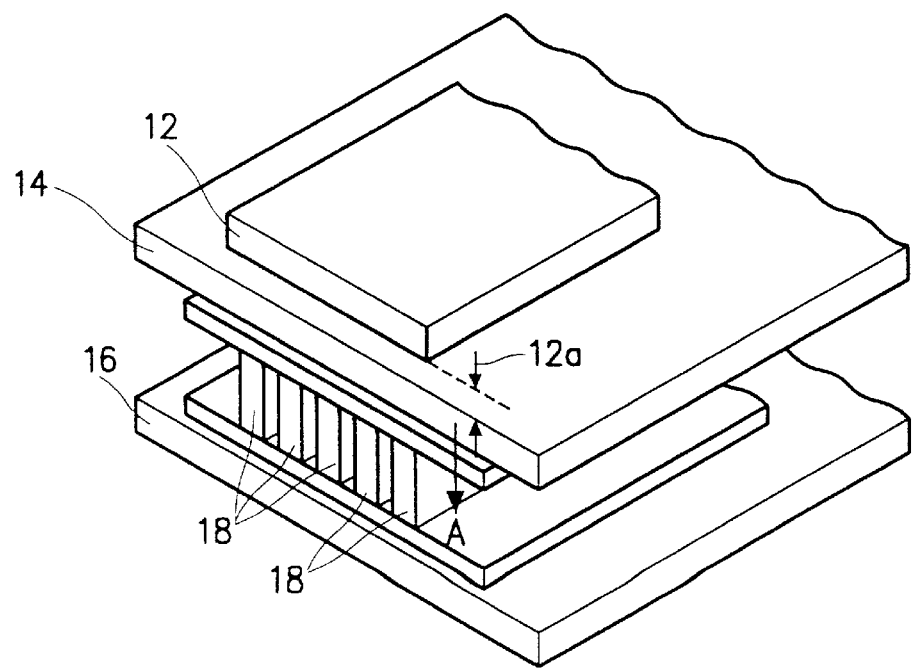
FIG. 8 is a perspective view of a magneto-resistive head according to a third preferred embodiment of the present invention.

Referring to FIGS. 7 and 8, two or more magneto-resistive sensors can be provided for the purpose of increasing a resistance variation rate because the magneto-resistive sensors are positioned in parallel to tracks, that is, in the direction indicated by A. Here, magneto-resistive sensors 18 are spaced from one another by a predetermined distance, and the entire width of magneto-resistive sensors 18 is set to be smaller than the write width.

According to the present invention as described above, asymmetry of a magneto-resistive sensor to tracks is overcome by disposing the magneto-resistive sensor in parallel to tracks. When such sensors are multi-layered, durability of the magneto-resistive head against static electricity can be increased, and even if a few of them are damaged, the remainder can operate normally. Thus, a magneto-resistive head of the present invention can be constructed with the magneto-resistive sensors operating in a simultaneously redundant manner, such that if some of the sensors fail, the head is still operational.

While the present invention has been described in detail with reference to the specific embodiments, they are mere exemplary applications. Therefore, it is to be clearly understood that many variations can be made by anyone skilled in the art within the scope and spirit of the present invention.

What is claimed is:

1. A magneto-resistive head, comprising:
   an upper write pole whose width defines a write track width;
   a lower write pole positioned under said upper write pole and separated from said upper write pole by a write gap;
   a first magneto-resistive sensor positioned under the lower write pole, separated from the lower write pole by a pole-sensor gap, said magneto-resistive sensor having a longer edge, said longer edge oriented perpendicular to the direction of the write track width; and
   a shield positioned under the first magneto-resistive sensor, separated from the magnetoresistive sensor by a shield gap.

2. The magneto-resistive head of claim 1, further comprising a second magneto-resistive sensor positioned parallel to said first magneto-resistive sensor.

3. The magneto-resistive head of claim 2, where the second magneto-resistive sensor is spaced apart from the first second magneto-resistive sensor by a predetermined distance.

4. The magneto-resistive head of claim 3, where the total width of the magneto-resistive sensors in the direction of the write track width is less than the write track width.

5. The magneto-resistive head of claim 2, the magneto-resistive sensors being constructed to operate simultaneously redundantly.

6. The magneto-resistive head of claim 2, further comprising a slider with an air-bearing surface;
   the upper write pole, the lower write pole, the first and second magneto-resistive sensors and the shield mounted in grooves of the air-bearing surface.

7. The magneto-resistive head of claim 6, the grooves of said air-bearing surface being leveled by sputtering.

8. A method of using the magneto-resistive head of claim 2, comprising the step of using the magneto-resistive head to read magnetic data from a magnetic hard disk.

9. A method of using the magneto-resistive head of claim 1, comprising the step of using the magneto-resistive head to read magnetic data from a magnetic hard disk.

10. The magneto-resistive head of claim 1, further comprising a soft adjacent layer in the first magneto-resistive sensor.

11. The magneto-resistive head of claim 1, further comprising a slider with an air-bearing surface;
    the upper write pole, the lower write pole, the first magneto-resistive sensor and the shield mounted in grooves of the air-bearing surface.

12. The magneto-resistive head of claim 11, the grooves of said air-bearing surface being leveled by sputtering.

13. The magneto-resistive head of claim 1, further comprising a plurality of magneto-resistive sensors positioned parallel to said first magneto-resistive sensor.

14. The magneto-resistive head of claim 13, where the magneto-resistive sensors are each spaced apart from the next by a predetermined distance.

15. The magneto-resistive head of claim 14, where the total width of the magneto-resistive sensors in the direction of the write track width is less than the write track width.

16. The magneto-resistive head of claim 14, the magneto-resistive sensors being constructed to operate simultaneously redundantly.

17. The magneto-resistive head of claim 13, further comprising a slider with an air-bearing surface;
    the upper write pole, the lower write pole, the magneto-resistive sensors and the shield mounted in grooves of the air-bearing surface.

18. The magneto-resistive head of claim 17, the grooves of said air-bearing surface being leveled by sputtering.

19. A method of using the magneto-resistive head of claim 6, comprising the step of using the magneto-resistive head to read magnetic data from a magnetic disk.

* * * * *